United States Patent
Miyatake et al.

(10) Patent No.: US 6,798,908 B2
(45) Date of Patent: Sep. 28, 2004

(54) SURVEILLANCE APPARATUS AND RECORDING MEDIUM RECORDED SURVEILLANCE PROGRAM

(75) Inventors: Takafumi Miyatake, Hachioji (JP); Shigeki Nagaya, Tokyo (JP); Akio Nagasaka, Kodaira (JP); Takehiro Fujita, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 09/741,808

(22) Filed: Dec. 22, 2000

(65) Prior Publication Data

US 2001/0010731 A1 Aug. 2, 2001

(30) Foreign Application Priority Data

Dec. 27, 1999 (JP) .......................................... 11-369141

(51) Int. Cl.[7] .............................. G06K 9/46; G06K 9/66
(52) U.S. Cl. ...................... 382/190; 348/135; 348/152; 348/169; 382/103; 382/107; 382/165; 382/218
(58) Field of Search ............................... 345/419–425, 345/430, 435, 437, 442, 582; 382/103, 107, 168–176, 180, 190, 192, 203, 268, 270–272, 275, 283, 285, 302, 304; 348/135, 152, 169

(56) References Cited

U.S. PATENT DOCUMENTS

| | | | | |
|---|---|---|---|---|
| 5,278,914 A | * | 1/1994 | Kinoshita et al. ............ | 382/100 |
| 5,574,762 A | * | 11/1996 | Sato et al. ...................... | 377/6 |
| 5,748,775 A | * | 5/1998 | Tsuchikawa et al. ......... | 382/190 |
| 5,880,775 A | | 3/1999 | Ross | |
| 5,991,428 A | * | 11/1999 | Taniguchi .................... | 382/107 |
| 6,141,435 A | * | 10/2000 | Naoi et al. ................... | 382/104 |
| 6,333,993 B1 | * | 12/2001 | Sakamoto .................... | 382/173 |
| 6,335,988 B1 | * | 1/2002 | Kondo ......................... | 382/236 |
| 6,356,272 B1 | * | 3/2002 | Matsumoto et al. ......... | 345/582 |
| 6,430,303 B1 | * | 8/2002 | Naoi et al. ................... | 382/104 |
| 6,453,069 B1 | * | 9/2002 | Matsugu et al. ............. | 382/173 |
| 6,546,115 B1 | * | 4/2003 | Ito et al. ...................... | 382/100 |
| 6,556,708 B1 | * | 4/2003 | Christian et al. ............ | 382/165 |
| 6,671,419 B1 | * | 12/2003 | Martins ....................... | 382/274 |
| 6,681,058 B1 | * | 1/2004 | Hanna et al. ................ | 382/294 |

FOREIGN PATENT DOCUMENTS

| | | |
|---|---|---|
| EP | 0 183 106 | 6/1986 |
| GB | 2 150 724 | 7/1985 |
| GB | 2 183 878 | 6/1987 |
| JP | A-10-105839 | 4/1998 |
| JP | A-514893 | 11/2000 |

* cited by examiner

Primary Examiner—Bhavesh M. Mehta
Assistant Examiner—Gregory Desire
(74) Attorney, Agent, or Firm—Antonelli, Terry, Stout & Kraus, LLP

(57) ABSTRACT

An economical surveillance apparatus robust to an environmental change includes an input unit for inputting images in a time series, a background image memory unit for storing a plurality of input images, a difference image memory unit for calculating and storing difference degree between a plurality of background images of the background image memory unit and an image inputted afresh, and a judging unit for judging an existence/absence of an invading object by utilizing the value of the difference degree of the difference image memory unit. This surveillance apparatus can automatically register a plurality of background images from a camera image. Since the background images that are no longer used are automatically erased, the drop of detection speed and detection sensitivity can be prevented.

17 Claims, 17 Drawing Sheets

FIG.8

| | | |
|---|---|---|
| RECORDING START YEAR/MONTH/DAY | | 161-1 |
| RECORDING START TIME | | 161-2 |
| NUMBER OF RECORDING N | | 161-3 |
| IMAGE 1 | FRAME NUMBER | 161-4 |
| | IMAGE ACQUISITION YEAR/MONTH/DAY | 161-5 |
| | IMAGE ACQUISITION TIME | 161-6 |
| | IMAGE DATA | 161-7 |
| ⋮ | ⋮ | |
| IMAGE N | FRAME NUMBER | |
| | IMAGE ACQUISITION YEAR/MONTH/DAY | |
| | IMAGE ACQUISITION TIME | |
| | IMAGE DATA | |

161

AVESEQ(i,j,k)
SHIFT BUFFER OF BLOCK-WISE MEAN VALUE IMAGE

CHANGESEQ(i,j,k)
SHIFT BUFFER OF BLOCK-WISE CHANGE REGION IMAGE

LABEL(i,j)
BLOCK-WISE INTERCONNECTION IMGE

| LABEL | xs | xe | ys | ye | area |
|---|---|---|---|---|---|
| 1 | 9 | 9 | 3 | 3 | 1 |
| 2 | 4 | 5 | 4 | 7 | 8 |
| ⋮ | ⋮ | ⋮ | ⋮ | ⋮ | ⋮ |

FEATURE(5,label)
FEATURE QUANTITY TABLE

TIME WAVEFORM OF DIFFERENCE DEGREE OF BLOCK WHEN NO BACKGROUND CHANGE EXISTS

TIME WAVEFORM OF DIFFERENCE DEGREE OF BLOCK WHEN BACKGROUND CHANGE EXISTS

TIME WAVEFORM OF DIFFERENCE DEGREE OF BLOCK WHEN INVADING OBJECT EXISTS

TIME WAVEFORM OF CHANGE HISTORY OF BLOCK WHEN BACKGROUND CHANGES PERIODICALLY

DETECTION PROCESSING

BLOCK-WISE CHANGE REGION IMAGE GENERATION PROCESSING

INVADING OBJECT JUDGEMENT PROCESSING

BACKGROUND IMAGE ERASE PROCESSING

SURVEILLANCE APPARATUS AND RECORDING MEDIUM RECORDED SURVEILLANCE PROGRAM

BACKGROUND OF THE INVENTION

This invention relates to a surveillance apparatus for use in the field of a surveillance system and to a software program for accomplishing the surveillance apparatus through a computer. More specifically, the present invention provides an economical surveillance apparatus that is robust to changes of an imaging environment, and a software program for accomplishing the surveillance apparatus.

Surveillance by using a camera has been conducted recently at various places such as roads, railroad crossings, public facilities, service floors of banks, convenience stores, elevators of apartment buildings, and so forth. The object of surveillance is to prevent accidents and crimes and to quickly take necessary counter-measures.

A surveillance system of public facilities such as electric power, gas supply, water distribution, etc, includes a plurality of surveillance cameras disposed not only indoors but also outdoors. Therefore, guards can grasp on the real time basis the condition of each site through monitor televisions of a surveillance center.

However, the requirement of continuously monitoring pictures from a plurality of surveillance cameras for an extended time is likely to invite "oversight" due to fatigue of the guards. It is therefore customary to employ a method that generates and reports an alarm sound only when any invading object or any abnormal condition is detected, as a surveillance system enabling the guards to watch and confirm the condition only when necessary. Various sensors such as infrared sensors, door sensors, temperature sensors, etc, have been used for the detection, or a method that directly analyzes the images from the surveillance cameras has been used.

The former has high reliability but involves a high cost because a large number of additional sensors must be installed besides the surveillance cameras. The latter does not require additional installation of specific sensors, hence is more economical. However, the latter is not free from the problem of an incorrect alarm because the camera images fluctuate at places where an environmental change is vigorous, such as outdoors, due to sways of trees, rain and snow, reflection of water surfaces, and so forth.

A surveillance apparatus described in JP-A-5-14893, for example, detects an invading object by comparing a background image generated by a smoothing processing in a time direction with an input image. When the background does not change. Therefore, this type of surveillance apparatus can correctly detect the invading object. However, the surveillance apparatus still involves in principle the problem of excessive detection in an environment where the background incessantly changes, such as outdoors.

An image processing apparatus for surveillance according to JP-A-10-105839 uses a mean value of several past frames as a background image, calculates the difference between the background image and an input image to extract an abnormal image, further calculates its difference from a previous frame and distinguishes an abnormal change from others. Because the background image is generated by the mean image, degradation of the detection sensitivity occurs when an invaded object is contained in the background image.

SUMMARY OF THE INVENTION

In addition to the problems described above, the conventional surveillance apparatuses have the problem that when reliability is improved, the cost of production becomes higher, and when the cost is lowered, an incorrect alert increases. It is therefore an object of the present invention to provide an economical surveillance apparatus that is robust to an environmental change, and a software program for accomplishing the surveillance apparatus.

To accomplish this object, the present invention provide a surveillance apparatus including background image memory means for storing a plurality images inputted in a time series, memory means for recording a difference map, for calculating and storing a minimum value (difference degree) of an absolute value of a difference between a plurality of images and an image afresh inputted, for each pixel, and judgment means for judging the existence/absence of an invading body by using the difference.

These and other objects, features and advantages of the present invention will become more apparent in view of the following detailed description of the preferred embodiments in conjunction with the accompanying drawings.

BRIEF DESCRIPTION OF THE DRAWINGS

FIG. 8 shows an example of a data structure of recording data according to the present invention;

DESCRIPTION OF THE EMBODIMENTS

Figure 1:
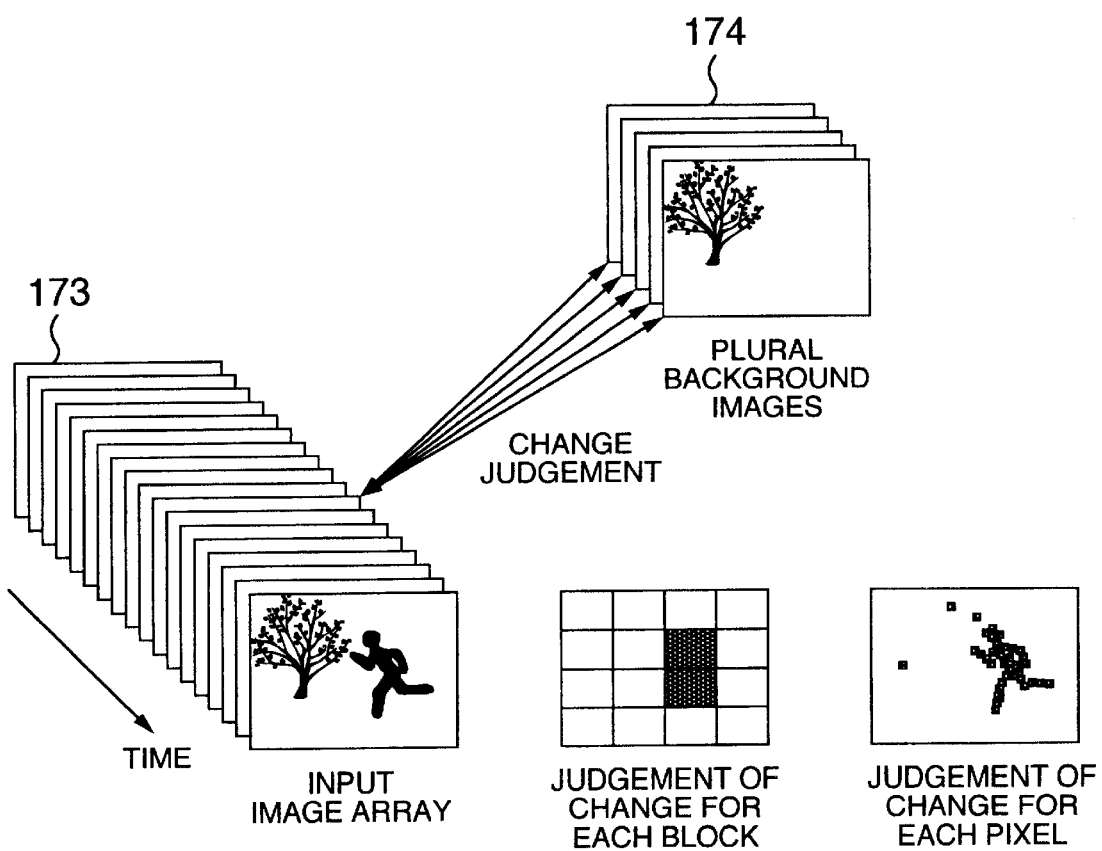
FIG. 1 shows a principle of detection of an invading object.

FIG. 1 shows a principle of an invading object detection by a surveillance apparatus according to the present invention. A background image 174 in which no invading object exists is stored in a memory in advance. This image is compared with an input image 173 to detect an image portion that has changed, and to identify whether or not any invading object enters the image of a surveillance camera. In this instance, several patterns of the background image are stored and all of them are compared with the input image. If there is the possibility of the sway of branches of background trees, for example, several patterns of the sway are stored beforehand. Even when the branches of the trees sway by wind, the input image coincides with any of the background images because the patterns of the sway are stored. Though mere sway of branches has been likely in the past to result in the erroneous judgment of the invading object, the present invention can accomplish robust detection of the invading object against fluctuation or changes of the background.

Figure 2:
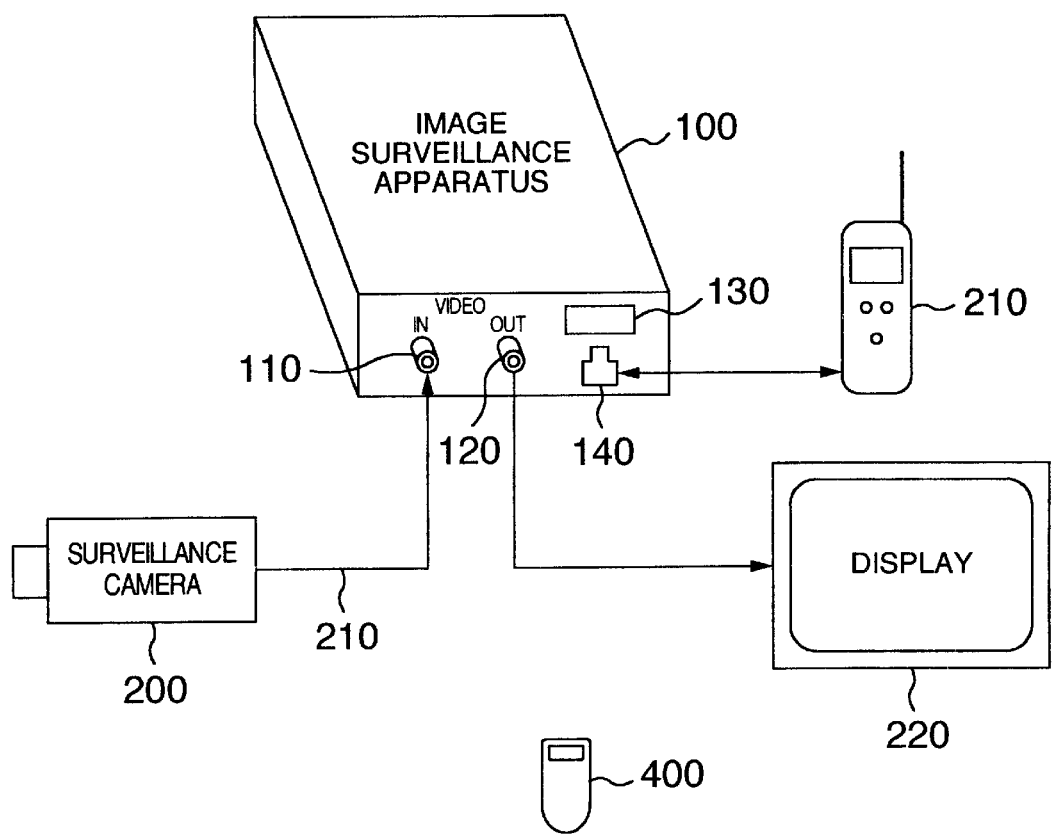
FIG. 2 shows a surveillance system utilizing a surveillance apparatus according to an embodiment of the present invention.

FIG. 2 shows an example of a surveillance system utilizing a surveillance apparatus according to the present invention. An image signal from a surveillance camera 200 is inputted from a video input terminal 110 of a surveillance apparatus 100 and is converted to a digital image. The digital image is displayed as an analog image on a display 220 from a video output terminal 110. An alarm signal generated when any invading object is judged as existing is sent from a MODEM terminal 140 to a surveillance center through a telephone line. A mobile phone 210, too, can be utilized in this case. The surveillance apparatus 100 is controlled by an instruction from a remote control device 400 through an IR (infrared ray) receiver 130.

Conventional analog surveillance cameras and displays can be as such utilized as surveillance equipment to be connected to the surveillance apparatus 100 according to the present invention. Furthermore, the alarm signals can be transferred to a remote place through the MODEM.

Figure 3:
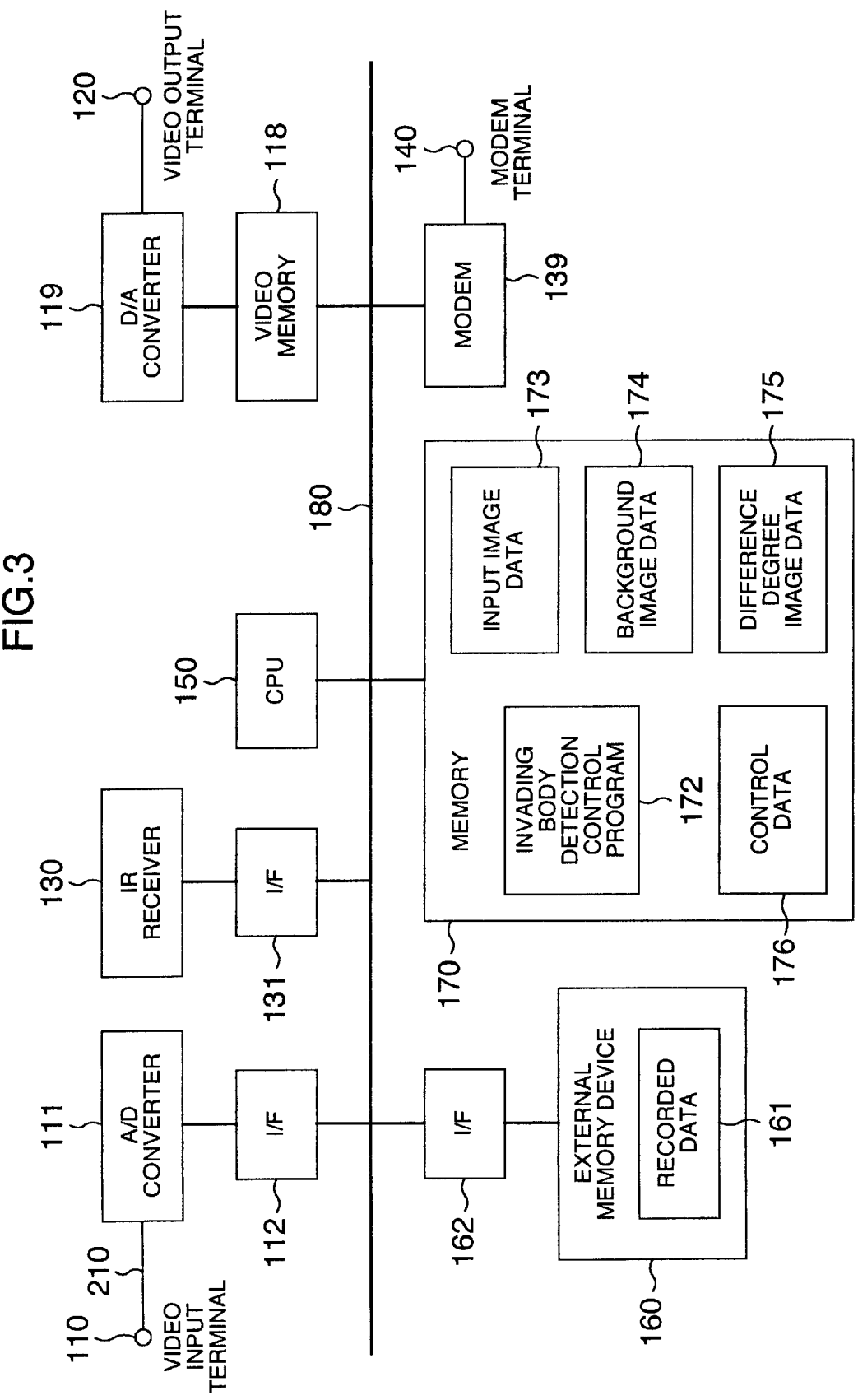
FIG. 3 is a system structural view of a surveillance apparatus according to an embodiment of the present invention.

FIG. 3 shows an example of a system construction when the surveillance apparatus 100 according to the present invention is achieved by using a general-purpose computer. In other words, the general-purpose computer executes a software program to accomplish the surveillance apparatus 100 according to the present invention.

Reference numeral 111 in the drawing denotes an A/D converter for converting an analog image signal 210 from a surveillance camera 200 to a digital image. The digital image so converted is inputted to a memory 170 through an interface 112 and at the same time, to a video memory 118.

The video memory 118 stores the image displayed on a display 220 as digital data. Reference numeral 119 denotes a D/A converter that is generally called "RAMDAC", too. This D/A converter 119 serially reads the data written to the video memory 118 in match with a line scanning speed and depicts an image on the display 220. Therefore, when the data of the video memory 118 is updated, the updated content is immediately reflected on the display content of the display 220.

The display 220 is a device for displaying the image. Such a display may be a compact CRT or a plasma display, for example, or a liquid crystal type display device. Continuous moving images can be displayed when such images are repeatedly inputted at a frequency of about 30 times/second.

An external memory device 160 is a large-capacity memory device such as a hard disk and semi-permanently stores the digital data. The external memory device 160 may be of a type that can be fitted to, and removed from, the apparatus main body for each storage device, such as a PCMCIA system hard disk card, or of a type in which only a recording medium is removable such as DVD-RAM or a flash memory.

A CPU 150 executes a software program for controlling invading object detection and for achieving the functions of the surveillance apparatus of the present invention. A memory 170 constantly stores the program, and stores also the data necessary for executing the program.

A modem 139 transfers recorded images and alarm information through a telephone line. An IR receiver 130 is an input device of information from the remote control device. The input information is transmitted to the CPU 150 through an interface 131 and is appropriately processed. Reference numeral 180 denotes a data bus for mutually connecting the devices described above.

In the system construction of the surveillance apparatus described above, according to an invading object detection control program 172 stored in the memory 170 in this embodiment the input image as input image date 173 is stored into the memory 170, serially transfers the image to the video memory 118 and displays the image on the display 220. After the invading object detection processing is completed, the image is stored as recorded image data in the external memory device 160, whenever necessary. When the invading object is judged as existing, the alarm signal is outputted through the MODEM 139.

Figure 4:
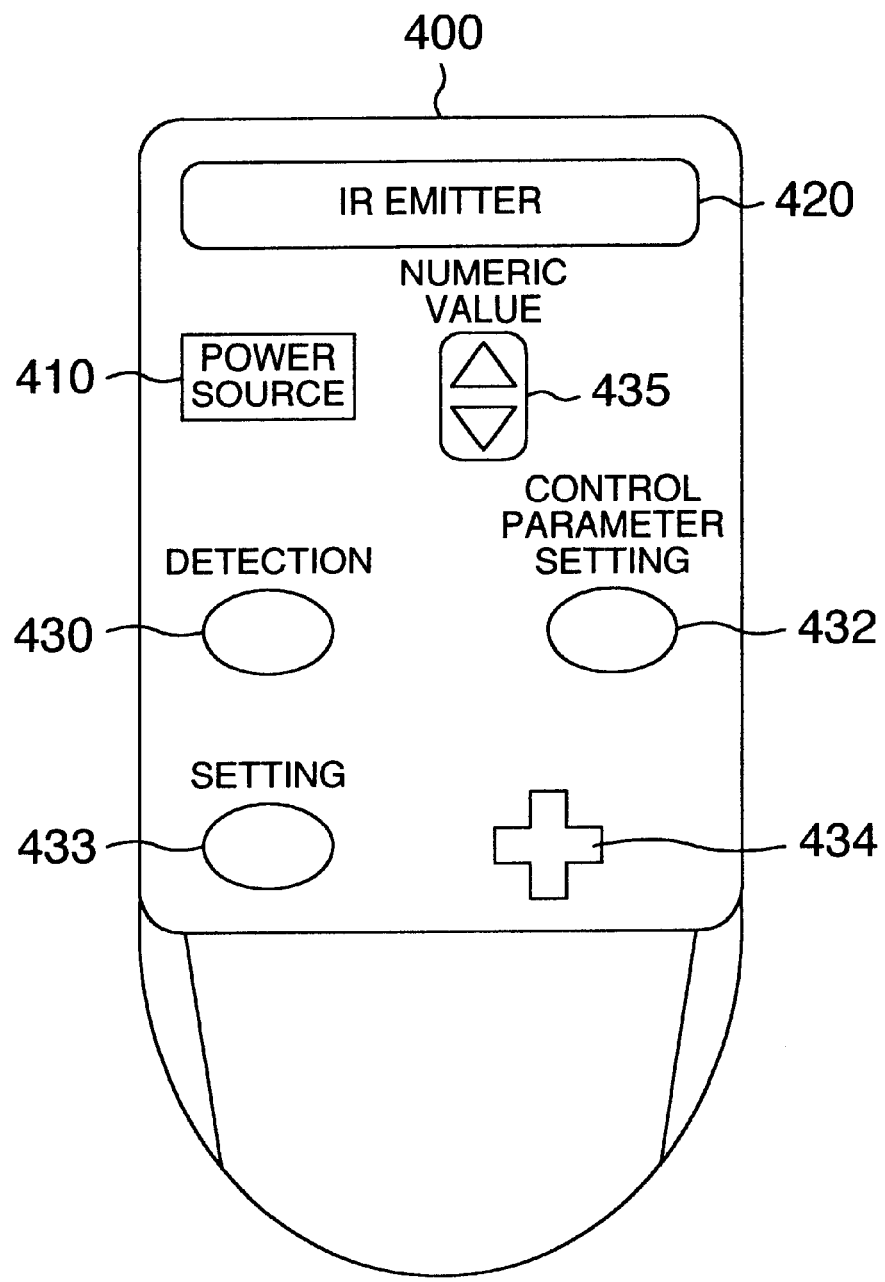
FIG. 4 shows an example of a remote control device according to the present invention.

FIG. 4 shows an example of the remote control device that gives instructions to the surveillance apparatus according to the present invention. All the instruction commands from the remote control device 400 are generated through IR signals from an IR emitting portion 420. Reference numeral 410 denotes a button for instructing ON/OFF of a power source. Reference numeral 430 denotes a button for instructing detection of the invading object. Reference numeral 432 denotes a button for setting control parameters of the invading object detection. Reference numeral 433 denotes a button for setting various data. Reference numeral 434 denotes a paddle switch for selecting items. This button can be moved to right and left and up and down. Reference numeral 435 denotes a paddle switch for setting numeric values of from 0 to 9. When the upper part of this button is pushed, a large value of up to 9 as the maximum is acquired. When its lower part is pushed, a smaller value of down to 0 is acquired.

Figure 5:
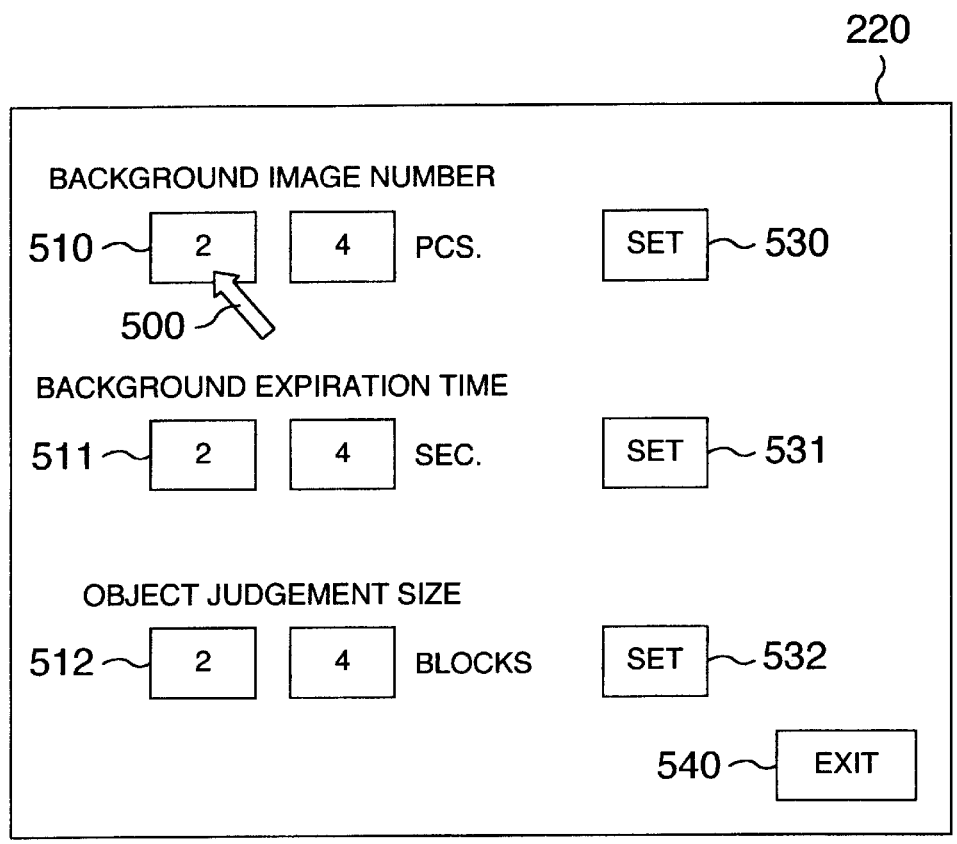
FIG. 5 shows an example of a control parameter-setting screen according to the present invention.

Next, the mode of operation of the control parameter-setting button 432 and the detection button 430 will be explained. When the control parameter-setting button 432 is pushed, a control parameter setting screen for the invading object detection, shown in FIG. 5, is displayed on the display 220. In FIG. 5, reference numeral 500 denotes a cursor. Reference numeral 510 denotes a background image number input region. Reference numeral 511 denotes a background expiration time input region as a period of time necessary for erasing the registered backgrounds. Reference numeral 512 denotes an object judgment size input region.

The paddle switch 434 is operated to position the cursor to a predetermined digit of the background image number input region 510. The paddle switch 435 is operated to input a desired background image number. Next, the cursor is moved to a setting region 530 and the setting button 433 is pushed. In consequence, the background image number that can be stored to maximum is set as a parameter.

Similarly, the paddle switch 434 is operated to position the cursor to a predetermined digit of the background expiration time input region 511. The paddle switch 435 is operated to input a desired background expiration time. Next, the cursor is moved to a setting region 531 and the setting button 433 is pushed. In consequence, the shortest background expiration time is set as a parameter.

The paddle switch 434 is further operated to position the cursor to a predetermined digit of an object judgment size input region 512, and the paddle switch 435 is operated to input a desired object judgment size. Next, the cursor is moved to a setting region 532 and the set button 433 is pushed. In consequence, a minimum object judgment size is set as a parameter.

Finally, the cursor is moved to a region 540 and the set button 433 is pushed, thereby completing the control parameter setting screen. Incidentally, it is also possible to furnish the surveillance apparatus itself with the buttons and the paddle switches in place of using the remote control device. When the general-purpose computer is used to achieve the surveillance apparatus of the present invention, the functions of the respective buttons and paddle switches may be allocated to the keys of the keyboard in place of the remote control device.

Figure 6:
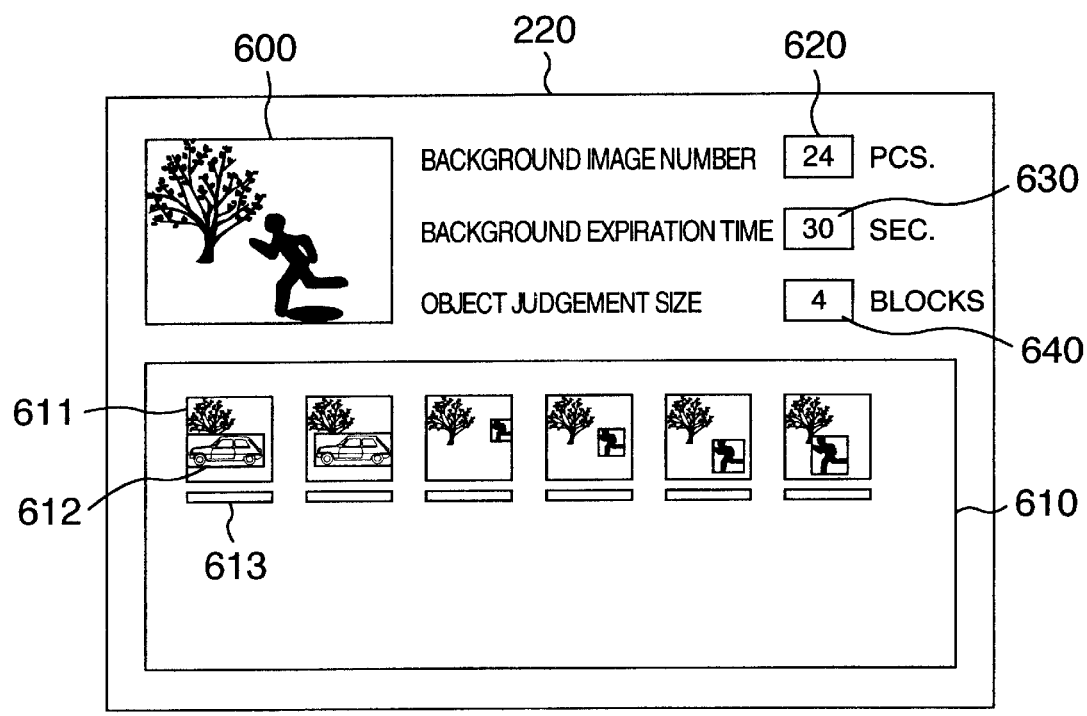
FIG. 6 shows an example of a basic screen according to the present invention.

When the detection button 430 is pushed, the basic screen shown in FIG. 6 is displayed on the display 220. In FIG. 6, reference numeral 600 denotes a display region of the input image. Reference numeral 610 denotes a region for tabulating and displaying the images generated by detecting and recording the invading object. Recorded images 611 are displayed in a reduced scale while they are aligned. At this time, an object existing region 612 and detection time information 613 are displayed, too. Reference numerals 620, 630 and 640 denote parameters that are set at present to detect the invading object. Reference numeral 620 denotes a background image number. Reference numeral 630 denotes a background expiration time and 640 does an object judgment size.

This basic screen enables a user to quickly grasp the detection condition of the invading object from the past to the present.

Figure 7:
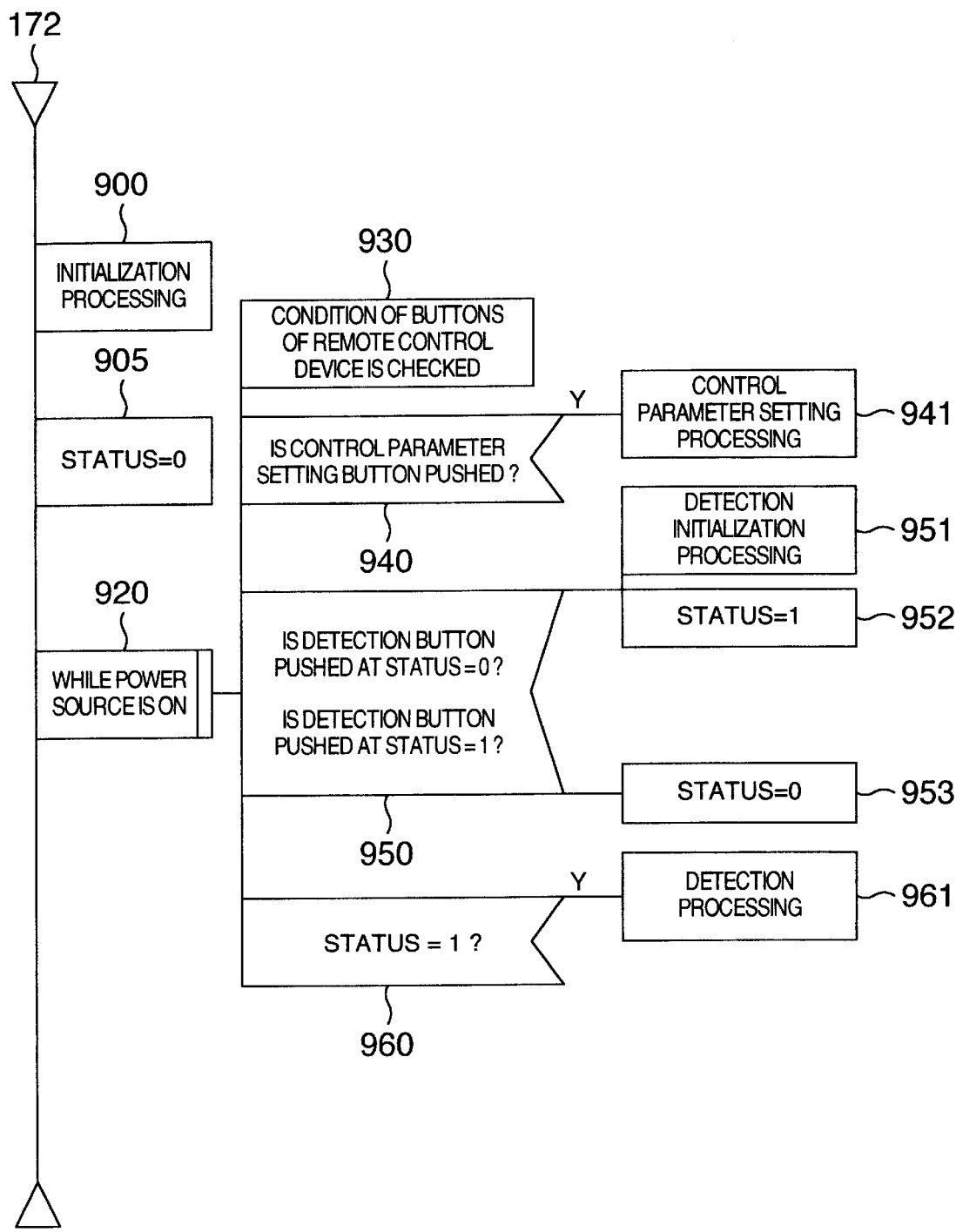
FIG. 7 is a flowchart of an invading object detection control program according to the present invention.

FIG. 7 shows an example of an invading object detection control program 172 for accomplishing control of the surveillance apparatus 100 of the present invention. A step 900 is an initialization processing. The display 220 displays the basic screen shown in FIG. 6. A step 905 resets a variable "STATUS" for controlling a status of detection to "0".

The following control processing is executed while a power source of the surveillance apparatus is turned on (step 920).

A step 930 checks the condition of the buttons of the remote control device 400, and a step 940 executes the following judgment processing.

When the control parameter-setting button 432 is pushed, a step 941 executes a control parameter-setting processing. This processing is an interactive processing with the user. After the system displays the control parameter-setting screen on the display, the user operates the remote control device 400 to input numeric values. After this processing is completed, the display content of the display returns to the basic screen shown in FIG. 6.

Next, a judgment processing of a step 950 is executed.

When the variable "STATUS" is "0" and the detection button 430 is pushed, a detection initialization processing 951 is executed. In this detection initialization processing, recording start year/month/day, a recording start time and a number of recording N (a number of recorded frames), that are the header information of recording data when the image containing the invading object is recorded, are written into the external memory device 160. The recording number is "0" at first. A frame number of the input image is initialized to "1", and the image is inputted from the surveillance camera and is registered as background image data 174. Control data 176 for detection is set to the initial state, too. A value "1" is set to the variable "STATUS" in step 952 to set the mode to a detection mode.

When the variable "STATUS" is "1" and the detection button 430 is pushed, a step 953 is executed. The variable "STATUS" is reset to "0" and the mode is brought to the detection finish state.

In a judgment processing of step 960, the detection process is conducted in a step 961 when STATUS is "1", and when any invading object is detected, the image is written into the external memory device 160 and the alarm signal is outputted. The detail of this detection processing will be explained later with reference to FIG. 13. Therefore, various data structures used for the detection processing will be first explained.

FIG. 8 shows an example of the data structure of the recorded data 161 in the present invention. The recorded data includes a header portion and an image portion. A recording start year/month/day 161-1, a recording start time 161-2 and the number of recording (a number of recorded frames) 161-3 are recorded to the header portion. A frame number 161-4, an image acquisition year/month/day 161-5, an image acquisition time 161-6 and image data 161-7 are recorded to the image portion.

Figure 9:
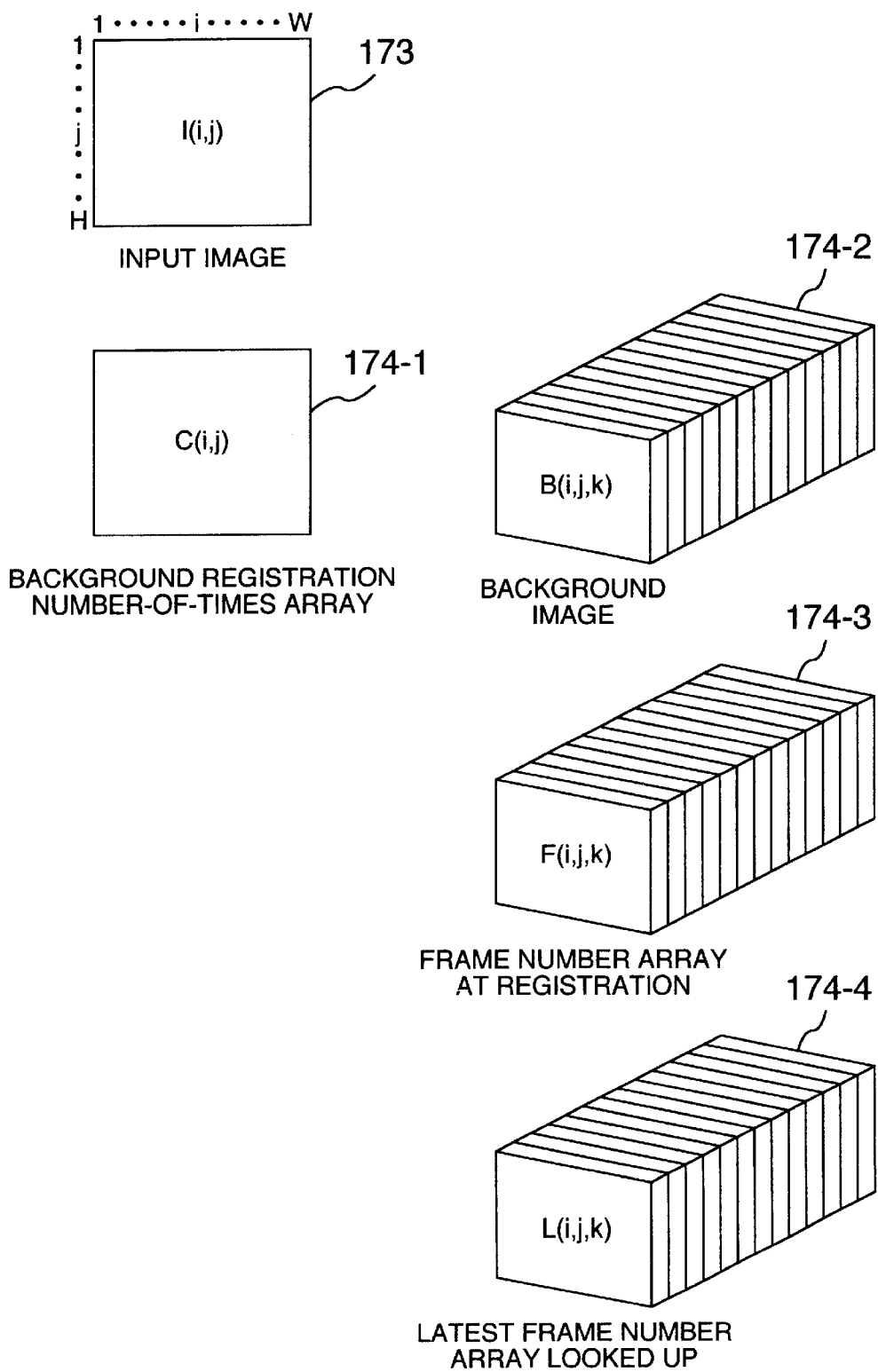
FIG. 9 shows an example of data structures of an input image and a background image according to the present invention.

FIG. 9 shows the data structures of the input image and the background image. Reference numeral 173 denotes the input image. The input image has W pixels in the transverse direction and H pixels in the longitudinal direction. In the images of the NTSC standard, W is 640 and H is 480. Reference numeral 174 denotes the background image. In the background image 174-2, maximum K pixel values are registered for each pixel at an (i, j) position. Background registration number-of-times array 174-1 is an array for storing the number of times of registration of the background pixel value for each pixel.

The data structure further includes a frame number array 174-3 at the time of registration, for storing reference history information as the background image for each pixel and the latest referred frame number array 174-4 that is looked up. The frame number array at the time of registration is an array for storing the frame number of the pixel values registered. In other words, it manages the time at which the background images are registered.

The latest referred frame number array is an array for storing the frame number of the pixel value that is looked up at the latest. In other words, it manages the time at which it is used lastly as the background image.

In the present invention, reference history information of the background image is stored for each pixel. Therefore, registration and erasing of the background image can be finely conducted in a pixel unit. In other words, under an imaging condition where only a part on the screen periodically changes, only the changing part can be additionally registered or erased as the background portion.

Figure 10:
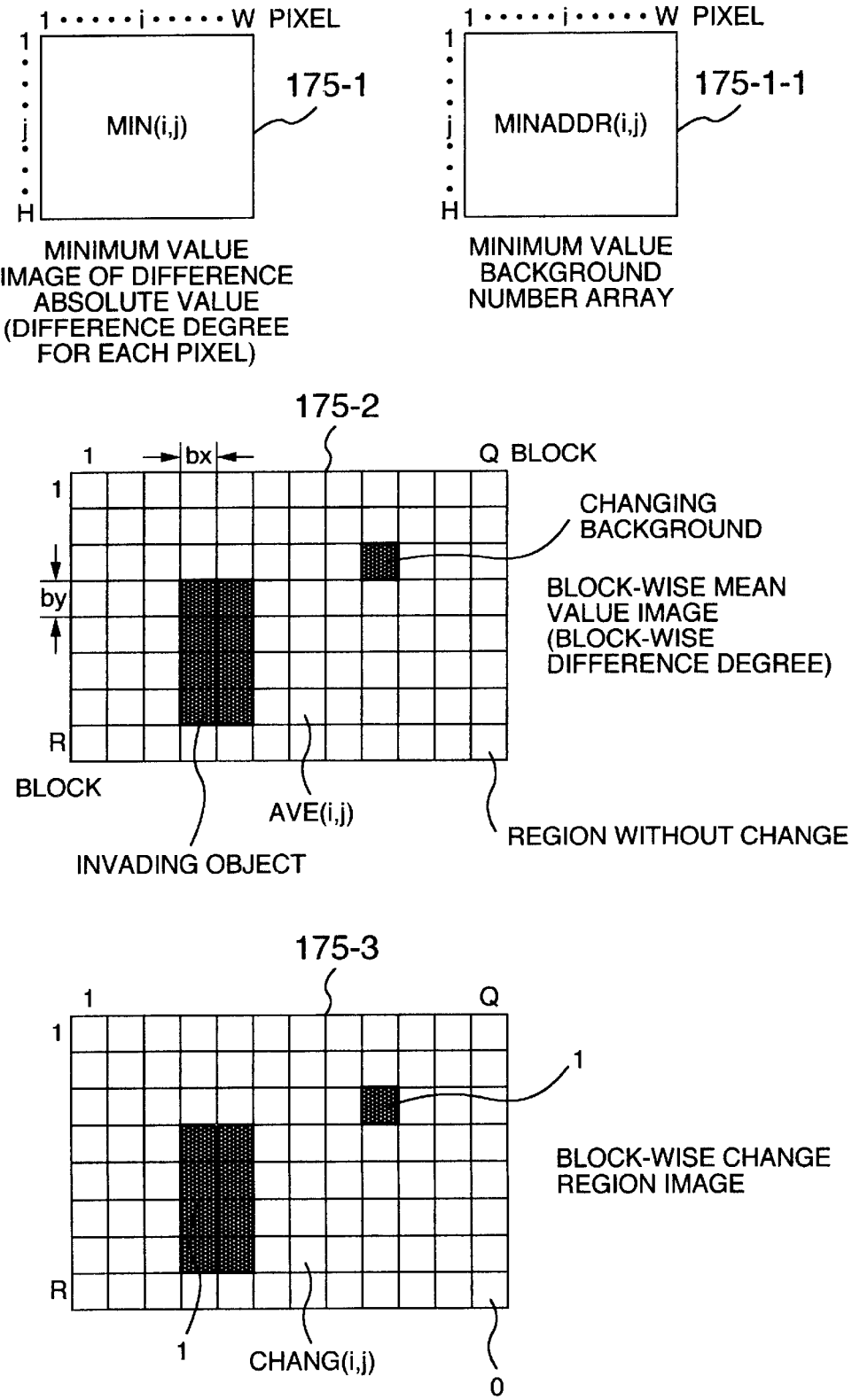
FIG. 10 shows an example of a data structure of a difference image according to the present invention.

FIG. 10 shows a data structure of a difference image comprising a minimum value (difference degree) of an absolute value of difference between the input image and a plurality of background images for each pixel. Reference numeral 175-1 denotes an image comprising a minimum value determined by calculating a value, at which the absolute value of the difference between a plurality of background images and the input image becomes minimal, for each pixel. The difference between the background image and the input image can be known in a pixel unit from this image. Reference numeral 175-1-1 denotes a minimum background number array for storing a background pixel number when the absolute value of difference is minimal. It becomes possible to know from the content of the minimum value background number array which background pixel is most analogous to the input pixel. When this minimum value background number array is used, reference history information of the background pixels can be simply updated.

Reference numeral 175-2 denotes a block-wise mean value image that stores a mean value of values inside each block when the minimum value image 175-1 is divided into Q transverse blocks and R longitudinal blocks. In this embodiment, Q is 16 and R is 12, but these values are not limitative. When the mean value is determined block-wise, the difference between the background image and the input image can be known in a block unit. Since the invading object has a certain size, detection performance becomes more robust by judging a rough difference in a block unit.

Reference numeral 175-3 denotes a block-wise change region image obtained by a processing which sets the block-wise mean value image 175-2 to "1" when it is greater than a predetermined threshold value and to "0" at other times. The block detected in this way has the value "1".

Figure 11:
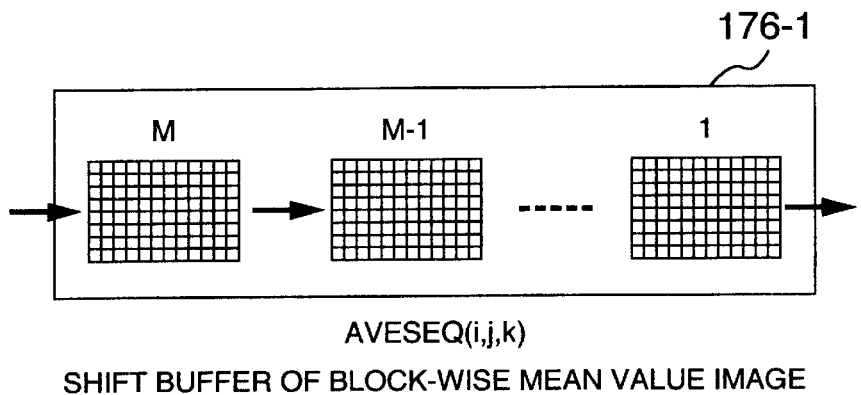
FIG. 11 shows an example of control data according to the present invention.
Figure 11:
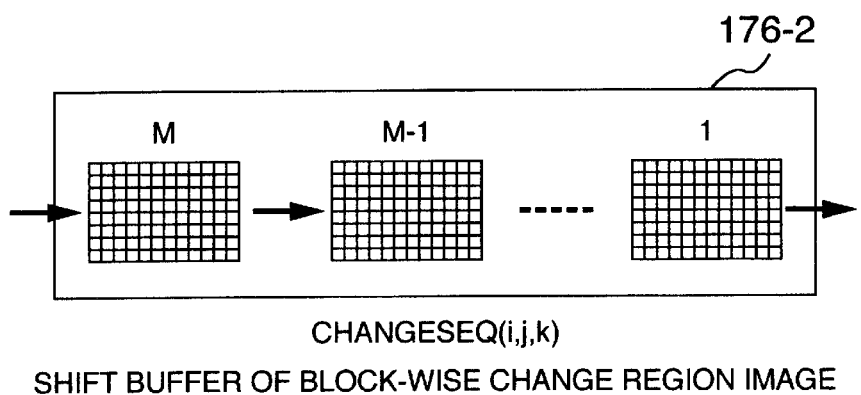
Figure 11:
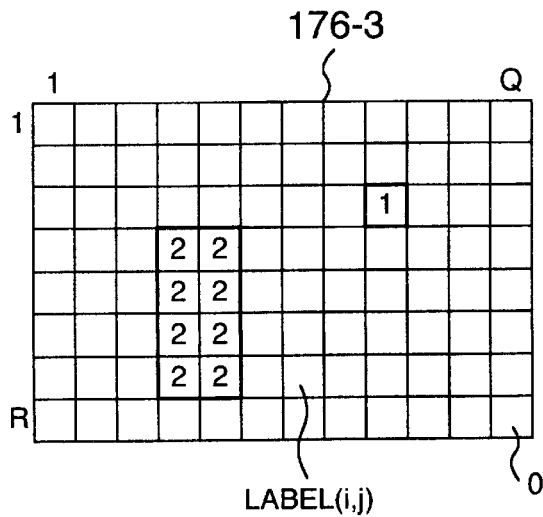

FIG. 11 denotes a structure of control data for detection. Reference numeral 176-1 denotes a FIFO (Fast-In Fast-Out) type shift buffer for storing the block-wise mean value images for past M frames. This structure is looked up when the change of the difference for each block is analyzed in a time series. Reference numeral 176-2 denotes a FIFO (Fast-In Fast-Out) type shift buffer for storing the block-wise change region images for each block for past M frames.

Reference numeral 176-3 denotes a block-wise interconnection image for allocating the same label for distinguishing individual interconnection components, for each connection component having the value "1" of the block-wise change region image 175-3. Reference numeral 176-4 denotes a feature quantity table that stores upper left coordinates (XS, YS) and lower right coordinates (XE, YE) of a circumscribing rectangle and its area for each label of the block-wise interconnection image 176-3. Final judgment as to whether the object is the invading object or other objects depend on whether or not this feature quantity coincides with a predetermined standard.

Figure 12A:
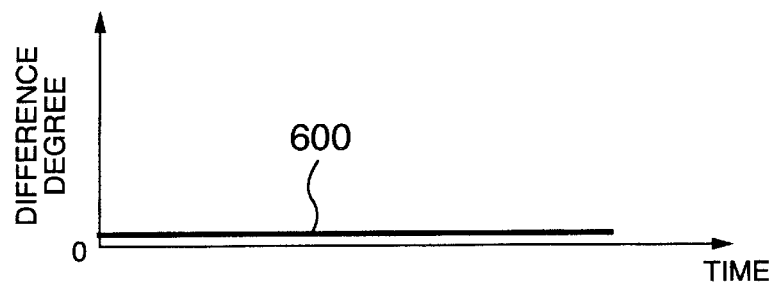
FIGS. 12A–12D show examples of waveforms of difference degree.
Figure 12B:
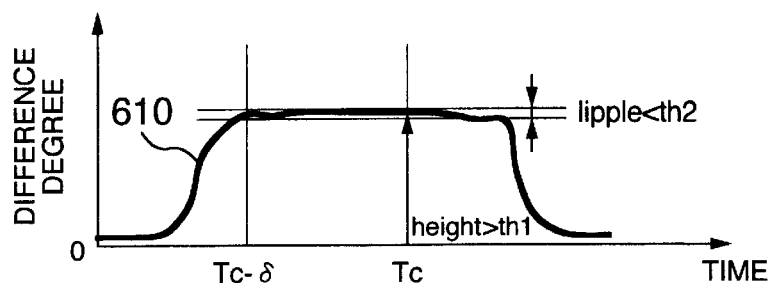

FIGS. 12A–12D show examples of time waveforms of the difference degree of each block in the present invention. FIG. 12A shows an example where no structural change of the background exists. In this case, the difference degree having small values continue. FIG. 12B shows an example where a structural change of the background exists. In this example, the difference degree have high values, and a flat condition continues. The case where the structural change of the background exists includes the case where a car comes to and parks at a place under surveillance, for example. The car is not a part of the background at the beginning but becomes a part after it parks.

Figure 12C:
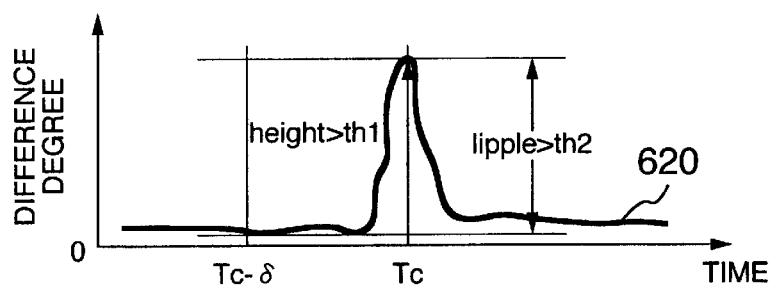

When the background entirely changes from the previous state, the present invention registers afresh the input image as the background image. FIG. 12C shows an example where the invading object exists, and difference degree reaches a high value only for a short time. This is the case where a person passes by the place under surveillance, for example. Detecting blocks exhibiting such a change, the present invention judges the number of times of the changes in this block and spatial expansion of the changing block, and classifies the change into the periodic change of the background and the true invading object.

Figure 12D:
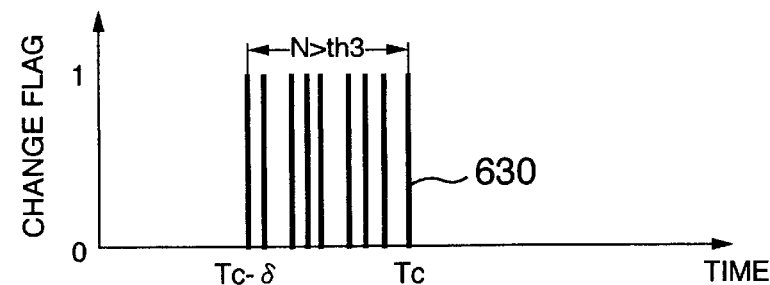

FIG. 12D shows an example of a waveform of a block change when the background changes periodically due to influences of wind, and so forth. In such a case, a large number of changes occur within a short time. Detecting such a block, the present invention judges this block as the changing background and registers the input image of this block portion as a new background for each pixel.

Even when the surveillance camera images swaying trees or reflection of the water surface, the function of the present invention for registering a plurality of backgrounds for each pixel can eliminate incorrect judgment of such trees or reflection as the invading object and continuous generation of the alarm. Incidentally, the range δ of the past reference time is 2 seconds, that is, 60 frames (M=60), but this value is not restrictive.

Figure 13:
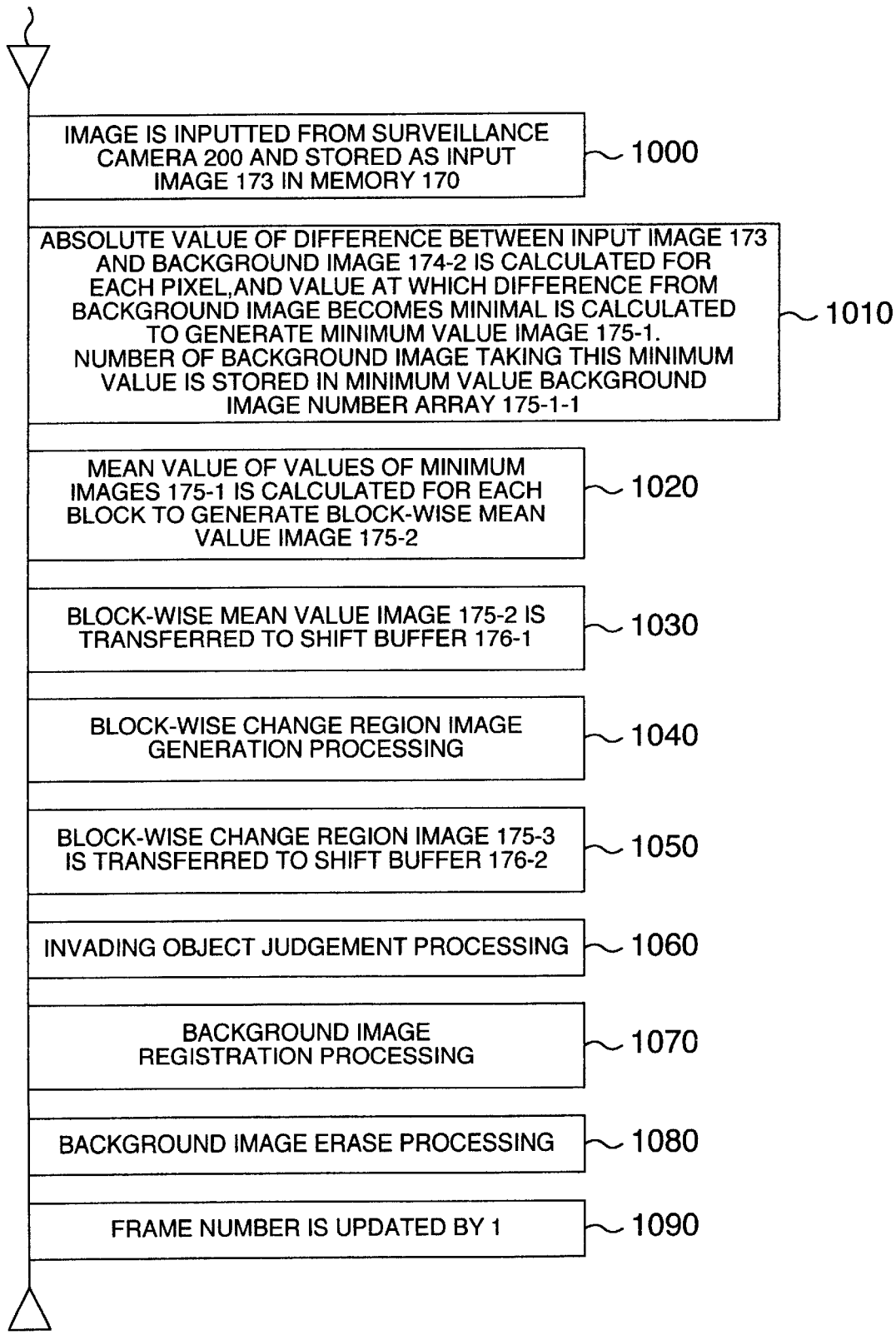
FIG. 13 is a flowchart of a detection processing according to the present invention.

FIG. 13 is a flowchart showing the detail of the detection processing 961 in the present invention.

First, in a step 1000, the image from the surveillance camera 200 is inputted and the image as the input image 173 is stored in the memory 170.

In a next step 1010, an absolute value of the difference between the input image 173 and the background image 174-2 is calculated for each pixel, then calculates a minimum value among all the background images is calculated and a minimum value image 175-1 is generated. In this step, the number of the background image assuming the minimum value is stored to a minimum value background number array 175-1-1.

In a step 1020, a mean value of the value of the minimum value image 175-1 is calculated for each block and a block-wise mean value image 175-2 is generated. The block-wise mean value image 175-2 thus generated is transferred further to a shift buffer 176-1 in a step 1030.

In a next step 1040, a block-wise change region image 175-2 is generated. The detail of this step will be explained later with reference to FIG. 14. In a step 1050, the block-wise change region image 175-2 is transferred to a shift buffer 176-2. On the basis of the data generated by the process steps described above, an invading object judgment processing is executed in a step 1060, a background image registration processing is executed in a step 1070 and a background image erase processing is executed in a step 1080. Finally, in a step 1090, the frame number is incremented by one.

Even when any change occurs in the background during imaging by the surveillance camera, the process steps of the present invention described above automatically update the background and can stably detect only the invading object.

The steps 1040, 1060, 1070 and 1080 will be explained in further detail with reference to FIGS. 14, 15, 16 and 17.

Figure 14:
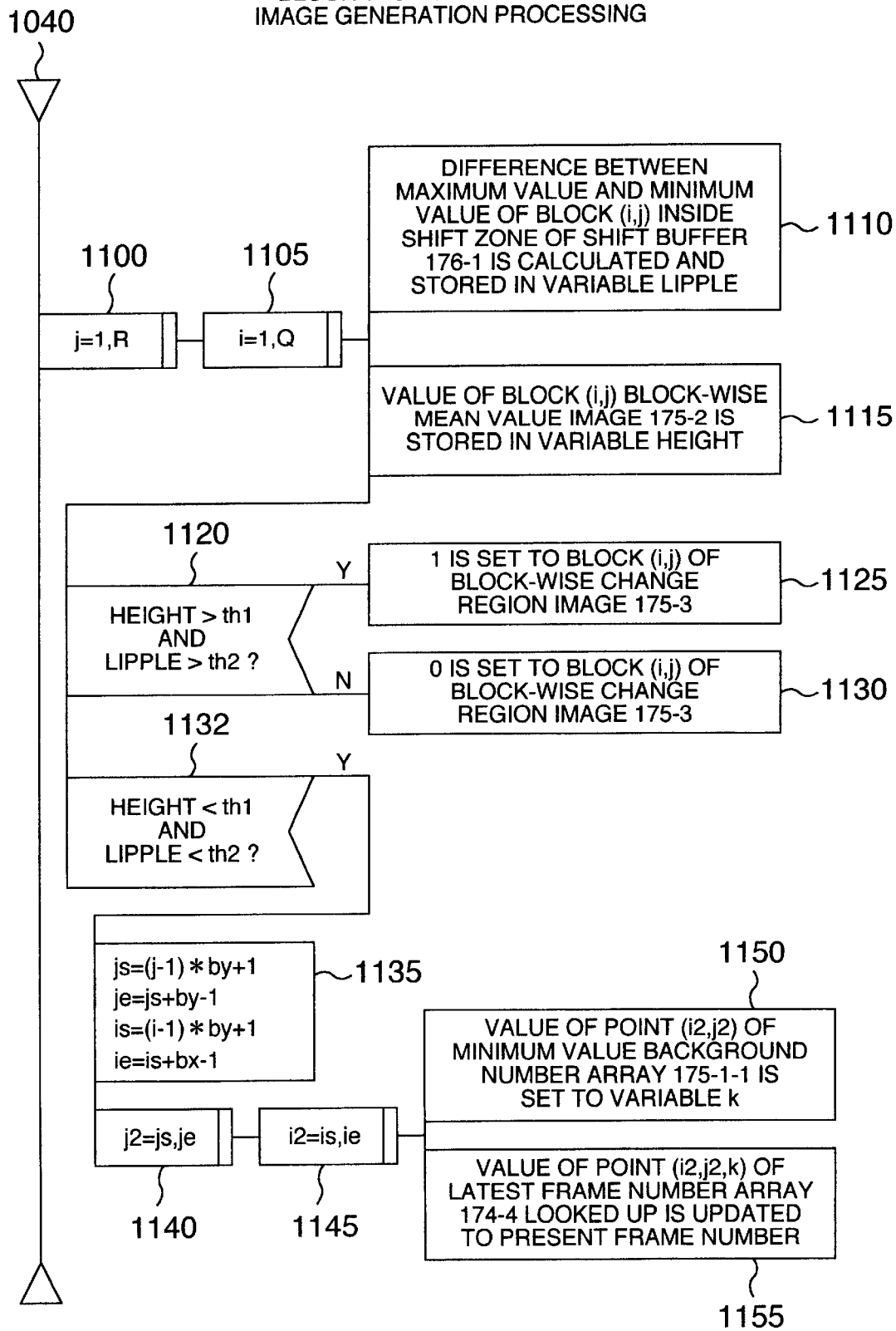
FIG. 14 is a flowchart of a block-wise change region image generation according to the present invention.

FIG. 14 is a flowchart showing the detail of a block-wise change region generation processing. This embodiment divides the whole screen into Q×R=16×12 blocks. When a large body is to be detected, however, this division number may be smaller. The block-wise change region generation processing can be achieved when the following steps are executed for all the blocks.

First, a variable "LIPPLE" and a variable "HEIGHT", each for judging whether or not each block changes, are calculated. In a step 1110, the difference between a maximum value and a minimum value of a block (i, j) inside a shift zone of the shift buffer 176-1 storing the block-wise mean value image is calculated, and the difference is stored in the variable "LIPPLE". Next, the value of the block (i, j) of the block-wise mean value image 175-2 of the present frame is stored in the variable "HEIGHT".

In a step 1120, it is judged that whether or not the variable "HEIGHT" (block mean value of present frame) is greater than a predetermined threshold value th1 and also the variable "LIPPLE" (the difference between the maximum value and the minimum value of the block mean value of the present frame) is greater than a predetermined threshold value th2. When both variables are greater than the respective threshold values, the state is judged as the state shown in FIG. 12C. In a step 1125, "1" is set to the block (i, j) of the block-wise change region image 175-3. When both are smaller, on the other hand, in a step 1130 "0" is set to the block (i, j) of the block-wise change region image 175-3. In this embodiment, both th1 and th2 are 5 but other values may be used. Incidentally, the range of the value the pixels take is from 0 to 255.

In a step 1132, it is judged whether or not the variable "HEIGHT" is smaller than the predetermined threshold value th1 and the variable "LIPPLE" is smaller than the predetermined threshold value th2. If both variables are smaller than the respective threshold values, the state is judged as the state shown in FIG. 12A, and an update processing of the reference history information of the background image from the steps 1135 to 1155 is executed. In the step 1135, the range of the address of the block (i, j) on the practical image is calculated. It also updates the reference history information of the background pixel that is looked up.

First, in a step 1150, the value of the point (i2, j2) of the minimum value background number array 175-1-1 is set to the variable k. Next, the point (i2, j2, k) of the array 174-4 recording the latest frame number that is looked up in the step 1150 is updated to the present frame number. In this way, this embodiment updates the reference history information of the background pixels inside all the corresponding blocks when the image inputted at present coincides with the background image as a block.

Figure 15:
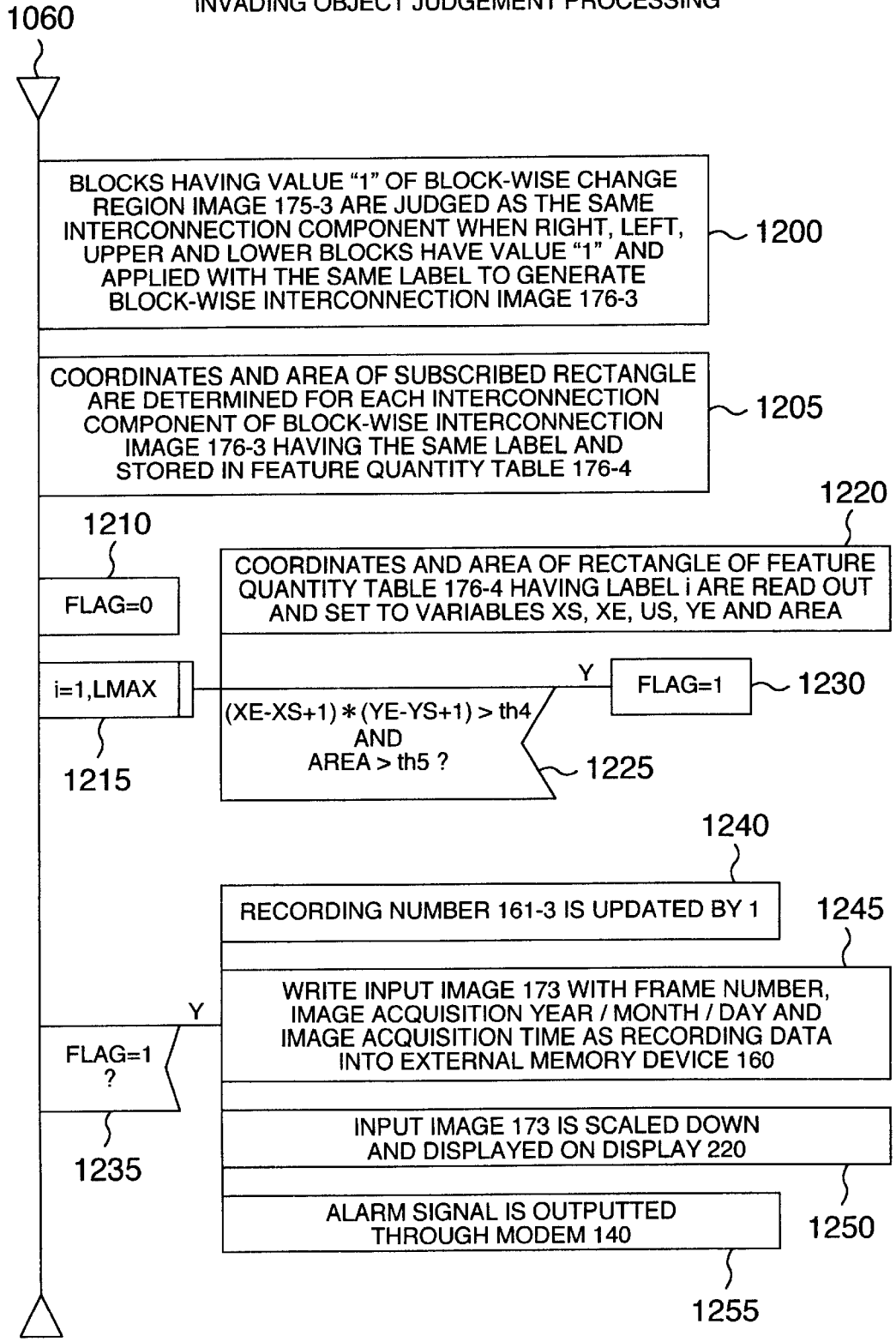
FIG. 15 is a flowchart of an invading object judgment processing according to the present invention.

FIG. 15 is a flowchart showing the detail of a judgment processing for judging the existence/absence of the invading object.

First, the feature quantities necessary for detecting the region of the invading object, that is, the coordinates of a circumscribed rectangle encompassing the invading object and the area of the rectangle, are determined. Therefore, as to the blocks having a value "1" of the block-wise change region image 175-3, in a step 1200, it is judged that these blocks as the same interconnection component if their left, right, upper or lower block is "1", the same label is provided to them and the block-wise interconnection image 176-3 is generated. In a step 1205, a circumscribed rectangle and its area for each interconnection component having the same label of the block-wise interconnected image 176-3 are determined and stored in the feature quantity table 176-4.

Next, in steps 1210 to 1230, the existence/absence of the invading object is examined. First, in the step 1210, a variable "FLAG" is reset to "0". When this variable "FLAG" changes to "1" in the subsequent steps, the invading object is judged as existing. The steps 1220 to 1230 are repeated for all the labels. In the step 1220, the coordinates of the circumscribed rectangle of the label i of the feature quantity table and its area are read out and set to variables XS, XE, YS, YE and AREA. In the step 1225, it is judged whether conditions (XE−XS+1)×(YE−YS+1)>th4 and AREA>th5 are satisfied. When these conditions are satisfied, in the step 1230, the variable FLAG is set to "1".

This embodiment judges both the size of the circumscribed rectangle and its area for the following reason. Since the properties of the shape of the invading object such as people are different from those of the invading object such as the swaying branches of trees, both of the features are employed for distinguishing their differences. Here, the concrete values of the threshold values th4 and th5 vary depending on the invading object to be detected. Therefore, the user sets in advance suitable values. In this embodiment, both th4 and th5 are 2.

Finally, in the step 1235, it is judged whether or not the variable "FLAG" is "1". When it is "1", the process at the time of existence of the invading object in the steps 1240 to 1255 is executed. In the step 1240, the recording number (the number of recorded frames) 161-3 is incremented by one. In the step 1245, the present input image 173 with the frame number, the image acquisition year/month/day and the image acquisition time as the recording data are written into the external memory device 160. Next, in the step 1250, the size of the input image 173 and displays the image on the display 220 is reduced. In this instance, the circumscribed rectangle encompassing the invading object may be overwritten and displayed in the image. The detection time may further be displayed. When display is made in this way, the user can instantaneously grasp the detection state of the invading object from the past to the present moment. In the step 1255, the alarm signal is output through the modem 140.

Figure 16:
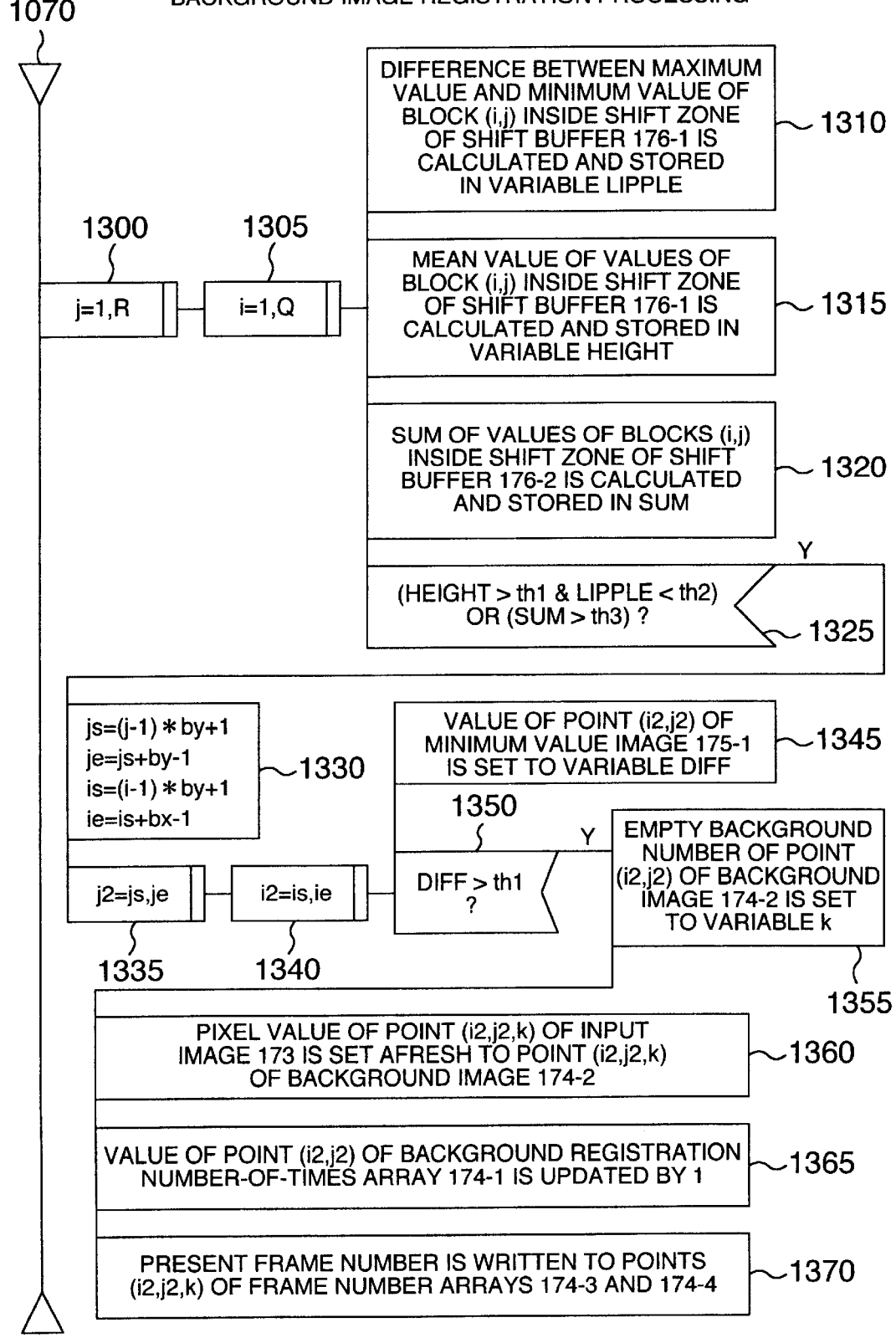
FIG. 16 is a flowchart of a background image registration processing according to the present invention.

FIG. 16 is a flowchart showing in detail the background image registration processing. The background image registration processing can be achieved by executing the following process for all the blocks. First, the variables "LIPPLE", "HEIGHT", and "SUM" are calculated to judge whether or not each block changes. In a step 1310, the difference between the maximum value and the minimum value of the block (i, j) inside the shift zone of the shift buffer 176-1 storing the block-wise mean value image is calculated and stored in the variable "LIPPLE". Next, in a step 1315, the mean value of the block (i, j) inside the shift zone of the shift buffer 176-1 is calculated and stored in the variable "HEIGHT".

In a step 1320, the sum of the values of the blocks (i, j) inside the shift zone of the shift buffer 176-2 storing the block-wise change region image is calculated and stored in the variable "SUM".

In a next step 1325, a registration condition of the background image is judged. The registration condition includes two conditions. The first one is "HEIGHT">th1 and "LIPPLE"<th2, and this is the case where the condition of FIG. 12B is detected. The second one is "SUM">th3, and this is the case where the condition of FIG. 12D is detected. The former represents the structural change of the background, and corresponds to the case where a car parks afresh inside the background, for example. The latter represents the periodic change of the background and corresponds to the case where branches of trees incessantly sway due to a strong wind.

When such conditions are detected, steps 1230 to 1370 are executed to afresh register the background image. Here, th3 is 30 in this embodiment. This is the value when the past reference time range δ is 2 seconds, that is, M=60, and represents detection of the condition where the background has changed more than 50% in the past.

In a step 1330, the range of the addresses on the practical images of the block (i, j) is calculated. Only when the difference degree of the pixels inside the block is excessively large, the pixel value of the input image is partially registered as a background image for each pixel.

First, in a step 1345, the value of a point (i2, j2) of the minimum value image 175-1 of the absolute value of the difference is set to a variable "DIFF". Next, in a step 1350, it is judges whether or not the variable "DIFF" is greater than th1. When it is greater, the pixels of the input image are different from all the background pixels that are registered at present. Therefore, steps 1355 to 1370 are executed to register the background pixels.

In the step 1355, the number of registration portion of an empty background of the point (i2, j2) of the background image 174-2 is set to a variable k. Next, in the step 1360, the pixel value of the point (i2, j2) of the input image 173 is registered afresh to the point (i2, j2, k) of the background image 174-2. In the step 1365, the value of the point (i2, j2) of the array 174-1 recording the number of times of background registration is incremented by one. Finally, in the step 1370, the present frame number is written in the frame number array 174-3 at the time of registration and to the point (i2, j2, k) of the latest frame number array 174-4 that is looked up.

Figure 17:
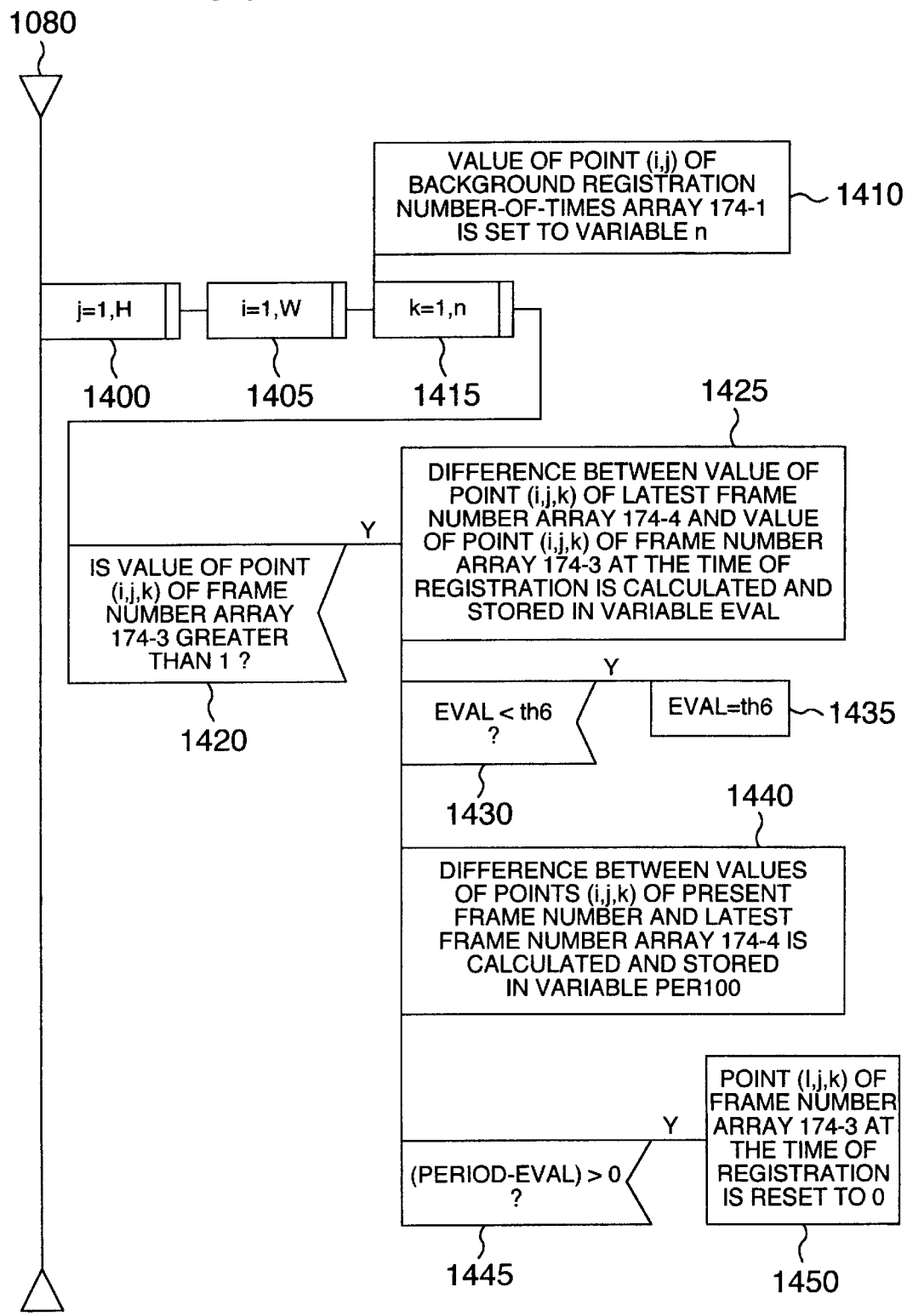
FIG. 17 is a flowchart of a background image erasing processing according to the present invention.

FIG. 17 is a flowchart that shows in detail a background image erase processing. Contrary to the processing shown in FIG. 16 for dynamically registering the background image, this processing dynamically erases the background images that are not used. This processing reduces the memory capacity necessary for the apparatus and shortens the computation time necessary for detecting the invading object. Further, this processing can prevent deterioration of detection sensitivity that occurs when a great number of unnecessary background images are stored.

First, steps 1410 to 1450 are executed for all the background images. In the step 1410, the value of the point (i,j) of the background registration number-of-times array 174-1 is set to the variable n. The following steps are executed for the variable k from 1 to n times.

First, in the step 1420, it is judged whether or not the value of the point (i, j, k) of the frame number array at the time of registration is greater than 1. When it is greater than 1, the background image is judged as being not yet erased, and the processing of the steps 1425 to 1450 is executed. In the step 1425, the difference between the value of the point (i, j, k) of the latest frame number array 174-4 that is looked up and the value of the point (i, j, k) of the frame number array 174-3 at the time of registration is calculated and stored in the variable "EVAL". The value of this variable "EVAL" represents the period in which the corresponding background pixel is looked up. In the step 1430, it is judged whether or not the variable "EVAL" is smaller than a predetermined threshold value th6. When the variable "EVAL" is smaller, the threshold value th6 is written to the variable "EVAL". Here, the threshold value th6 can take an arbitrary value. When a large value is set, the background can be stored for a long time. In this embodiment, th6 is set to a value of the number of frames corresponding to about 10 seconds, that is, 300. The reason why the threshold value th6 is written to the variable "EVAL" when the variable "EVAL" is smaller than the predetermined threshold value th6 is to prevent the background having a short reference time from being immediately erased.

Next, in the step 1440, the difference between the present frame number and the value of the point (i, j, k) of the latest frame number array 174-4 that is looked up is calculated and stored in a variable "PERIOD". This variable "PERIOD" represents the period that has not been looked up so far.

Importance of the present point is judged from a function using the two variables, i.e. the period "EVAL" that is looked up and the period "PERIOD" that is not looked up, and whether or not the background pixels are to be erased is decided. In this embodiment, the step 1445 executes this judgment by judging whether or not (PERIOD-EVAL) is positive, but whether or not (PERIOD-EVAL/K) is positive may be used as another judgment reference. Here, K is a constant. When judgment represents that background pixels should be erased, in the step 1450, the value of the point (i, j, k) of the frame number array 174-3 at the time of registration is reset to "0". In consequence, the corresponding background pixel is erased.

Since the present invention can detect the invading object from the image of the surveillance camera, the present invention does not require any additional sensors besides the surveillance camera and can therefore provide an economical surveillance apparatus. Because a plurality of background images can be automatically registered from the camera images from the place such as outdoors where the environmental change is vigorous, the present invention can provide a robust surveillance apparatus that does not generate an incorrect report even when the environmental change occurs due to the sway of trees, rain and water, reflection from the water surface, and so forth. Furthermore, because the background images that are not used are automatically erased, the present invention can prevent the drop of the detection speed and the detection sensitivity.

While the present invention has been described above in conjunction with the preferred embodiments, one of ordinary skill in the art could be enabled by this disclosure to make various modifications to the embodiments and still be within the scope and spirit of the invention as defined in the appended claims.

What is claimed is:

1. A surveillance apparatus comprising:
   input means for inputting images in a time series;
   background image memory means for registering a plurality of different background images from said images;
   difference image memory means for calculating and storing a minimum value of a difference between each of said plurality of different background images and an image inputted afresh for each pixel; and
   judgment means for judging an existence/absence of an invading object on the basis of said difference.

2. A surveillance apparatus according to claim 1, wherein each of said plurality of different background images comprises a single or a plurality of pixel values registered for each pixel.

3. A surveillance apparatus according to claim 2, wherein:
   each background image is registered or erased for each pixel;
   erasing is determined on the basis of a period from a registration time of said pixel to a time at which said pixel is last looked up, and a period from a time at which said pixel is last looked up to a present time;
   when registration is made, a new pixel value is written to an empty region if said empty region exists in said background image memory means, and if said empty region does not exist, importance of each pixel value of a corresponding pixel is calculated and is overwritten to an image value having the lowest degree of importance.

4. A surveillance apparatus according to claim 1, further comprising:
   memory means for recording said image inputted afresh for each pixel, when said judgment means judges that an invading object exists.

5. A surveillance apparatus according to claim 1, wherein:
   said difference image memory means includes minimum value image memory means for storing a minimum value image comprising an absolute value of a difference for each pixel, and block-wise mean image memory means for dividing said minimum value image into blocks, and calculating and storing a mean value of an absolute value of a difference for each block; and said judgment means judges an existence/absence of an invading object on the basis of a time series change of said mean value.

6. A surveillance system comprising:

one or more cameras arranged at different designated locations to capture images in a time series;

a display unit arranged to provide a visual display of the images from one or more cameras; and a surveillance apparatus arranged to detect and analyze the images from one or more cameras, said surveillance apparatus comprising:
  a memory device to store a surveillance program, and to register in advance a plurality of different background images; and
  a controller configured to execute the surveillance program to detect a presence/absence of an invading object from the images of one or more cameras, by determining an absolute value of a difference between an input image and each of said plurality of different background images for each pixel, determining a minimum value image among all the background images at which the difference between the input image and each of said plurality of different background images is minimal, determining a mean value of a difference for each discrete block within the minimum value image, and determining the presence/absence of an invading object on the basis of a time series change of said mean value.

7. A surveillance system according to claim 6, wherein each of said plurality of different background images comprises a single or a plurality of pixel values registered for each pixel.

8. A surveillance system according to claim 6, wherein:
  each background image is registered or erased for each pixel;
  erasing is determined on the basis of a period from a registration time of said pixel to a time at which said pixel is last looked up, and a period from a time at which said pixel is last looked up to a current time; and
  when registration is made, a new pixel value is written to an empty region if said empty region exists in a background image memory section of said memory device, and if said empty region does not exist, importance of each pixel value of a corresponding pixel is calculated and is overwritten to an image value having the lowest degree of importance.

9. A surveillance system according to claim 6, wherein said memory device comprises an input image section for recording an input image afresh for each pixel, when said controller determines that an invading object is present.

10. A surveillance system according to claim 6, wherein said memory device comprises:
  an input image storage section for storing an input image afresh for each pixel;
  a background image storage section for registering a plurality of different background images; and
  a difference image storage section for storing the minimum value image in discrete blocks, and for storing the mean value of the difference for each block.

11. A surveillance apparatus comprising:

an input device to input images in a time series;

a memory device to store a surveillance program, and to register in advance a plurality of different background images; and a controller configured to execute the surveillance program to detect a presence/absence of an invading object from the images of one or more cameras, by:
  determining an absolute value of a difference between an input image and each of said plurality of different background images for each pixel,
  determining a minimum value image among all the background images at which the difference between the input image and each of said plurality of different background images is minimal,
  determining a mean value of a difference for each discrete block within the minimum value image, and
  determining the presence/absence of an invading object on the basis of a time series change of said mean value.

12. A surveillance apparatus according to claim 11, wherein each of said plurality of different background images comprises a single or a plurality of pixel values registered for each pixel.

13. A surveillance apparatus according to claim 11, wherein:
  each background image is registered or erased for each pixel;
  erasing is determined on the basis of a period from a registration time of said pixel to a time at which said pixel is last looked up, and a period from a time at which said pixel is last looked up to a current time; and
  when registration is made, a new pixel value is written to an empty region if said empty region exists in a background image memory section of said memory device, and if said empty region does not exist, importance of each pixel value of a corresponding pixel is calculated and is overwritten to an image value having the lowest degree of importance.

14. A surveillance apparatus according to claim 11, wherein said memory device comprises an input image section for recording an input image afresh for each pixel, when said controller determines that an invading object is present.

15. A surveillance apparatus according to claim 11, wherein said memory device comprises:
  an input image storage section for storing an input image afresh for each pixel;
  a background image storage section for registering a plurality of different background images; and
  a difference image storage section for storing the minimum value image in discrete blocks, and for storing the mean value of the difference for each block.

16. A surveillance apparatus comprising:

an input device to input images;

a memory device to store in advance a plurality of different background images; and a controller configured to compare an image input afresh from the input device with each of said plurality of different background images stored in the memory device to obtain a minimum value of a difference between an input image and each of said plurality of different background images, and to determine whether an invading object is present in the input image base on the minimum value of the difference between the input image and each of said plurality of different background images,
wherein said memory device comprises an input image storage section to store the image input afresh from the input device, a background image storage section to register the plurality of different background images, and a difference image storage section to store the minimum value of the difference between the input image and each of said plurality of different background images.

17. A surveillance apparatus according to claim 16, wherein each of said plurality of different background images comprises a single or a plurality of pixel values registered for each pixel.

* * * * *